Dec. 30, 1958  J. G. HOLMSTROM  2,866,650
STEERING ARM FOR AUTOMOTIVE VEHICLE
Filed March 18, 1957  3 Sheets-Sheet 1
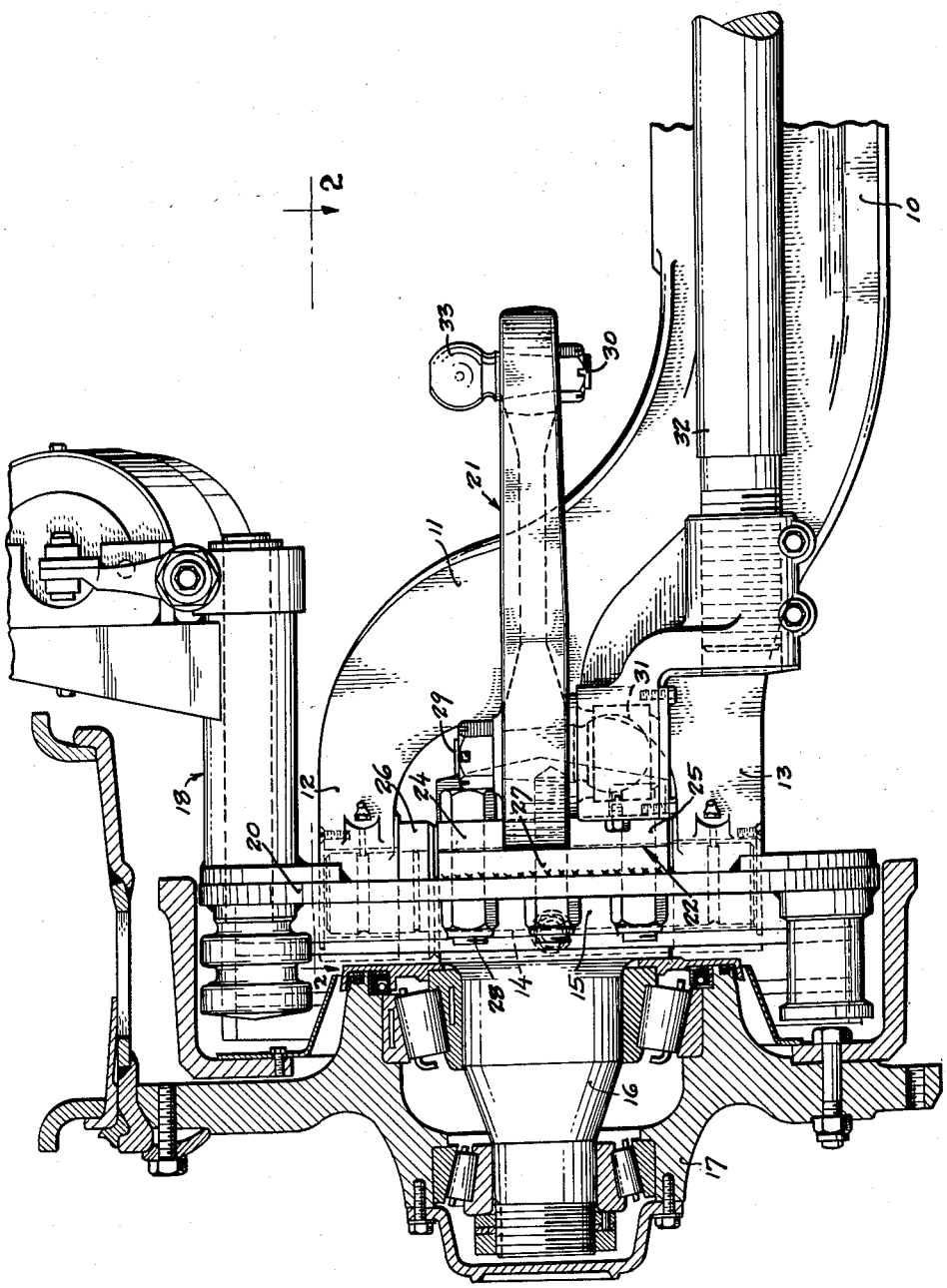
INVENTOR.
John G. Holmstrom
Attorneys Dec. 30, 1958   J. G. HOLMSTROM   2,866,650
STEERING ARM FOR AUTOMOTIVE VEHICLE
Filed March 18, 1957   3 Sheets-Sheet 2
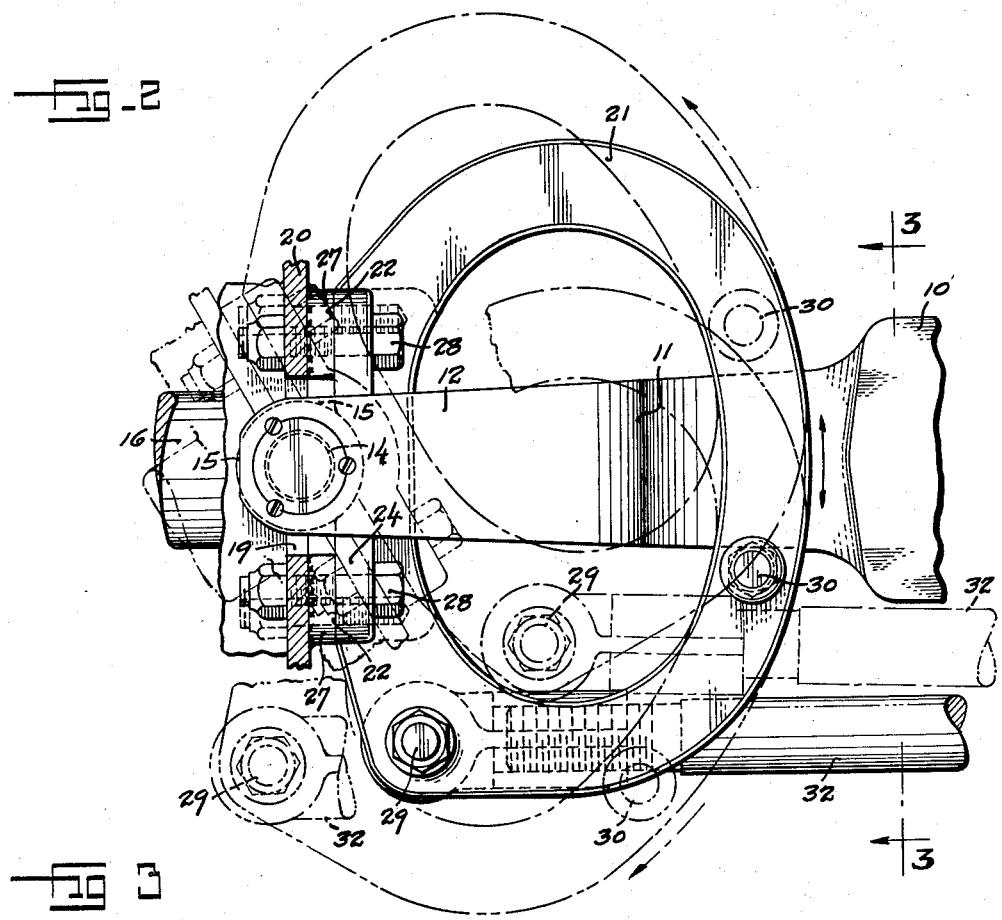
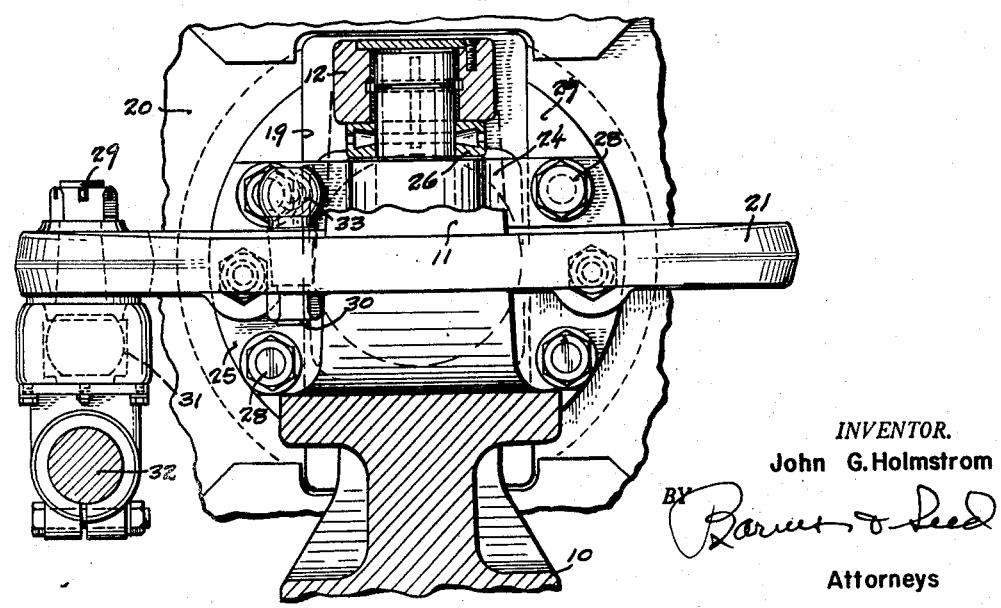
INVENTOR.
John G. Holmstrom
Attorneys

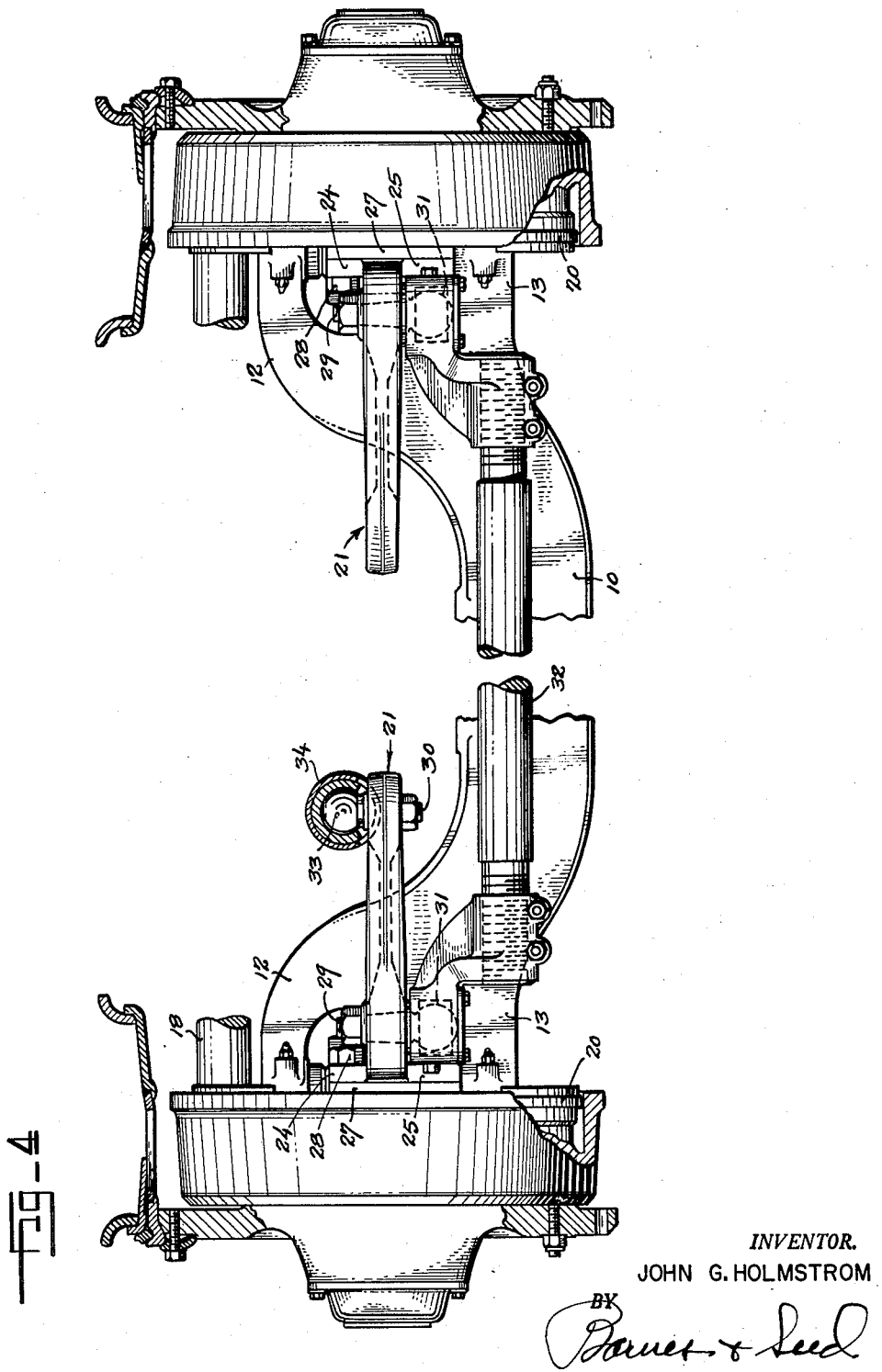

2,866,650

STEERING ARM FOR AUTOMOTIVE VEHICLE

John G. Holmstrom, Seattle, Wash., assignor to Pacific Car and Foundry Company, Seattle, Wash., a corporation of Washington Application March 18, 1957, Serial No. 646,647

3 Claims. (Cl. 280—96.3)

This invention relates to steering mechanisms, and pertains especially to a perfected steering arm particularly adapted for use on land vehicles, earth-movers for example, which are subjected to heavy-duty usage over roadbeds which are rough and poorly defined. In this type of usage the shock forces passed from the steerable front wheels into associated steering arm are of unusually severe intensity, and breakage becomes a problem not only from the standpoint of lay-ups, but more important, damage to the vehicle and injury to the driver in consequence of accidents.

In a conventional steering hook-up, forces passed from the steering arm into the drag-link and into the transverse tie-rod are each thrusts imposed endwise to the axis as compared with the bending moment to which the steering arm is subjected in consequence of road shocks. The steering arm thus becomes the weakest link in the steering assembly. The present invention purposes to provide an improved design of steering arm characterized by unusual strength and one particularly which will best withstand bending moments of extreme intensity.

This and other more particular objects and advantages in view will appear and be understood in the course of the following description and claims, the invention consisting in the novel construction and in the adaptation and combination of parts hereinafter described and claimed.

In the accompanying drawings:

Figure 1 is a fragmentary view partly in transverse vertical section and partly in elevation illustrating a steering assembly embodying a steering arm constructed in accordance with the preferred teachings of the present invention.

Fig. 2 is a fragmentary horizontal sectional view thereof drawn on line 2—2 of Fig. 1.

Fig. 3 is a fragmentary longitudinal vertical sectional view drawn on line 3—3 of Fig. 2; and Fig. 4 is a fragmentary transverse vertical sectional view drawn to a reduced scale on a section line immediately aft of the vehicle's axle beam to portray the two sides of a vehicle equipped with a steering assembly employing the steering arms of the present invention.

In said drawings there is portrayed an axle beam designated by the numeral 10 formed upon each end with a terminally forked perch offset upwardly from the beam proper so as to provide a vertical leg 11 yoking the fork-arms 12 and 13. Such fork-arms are co-axially bored to receive a vertical king-pin 14, the pin passing through a knuckle 15 carried as a fixed adjunct of the hub 16 of a related front wheel 17. A thrust washer 26 is interposed between such knuckle 15 and the upper fork-arm 12. Other than to note the presence upon said hub of an inwardly facing plate 20 serving as a carrier for brake mechanism denoted generally by 18 and also as a mounting for the hereinafter described steering arm, no need arises to here described in detail either the hub or its wheel, both being of the usual or a suitable construction.

The pivot center of the king-pin 14 lies in the plane occupied by said plate 20, and to accommodate the fork-arms 12 and 13 slots 19 are formed in said plate centrally of its width.

According to the present invention there is provided as a steering arm a member 21 the plan configuration of which suggests an elliptical ring, with one of the long sides of such ring presenting co-planar flats lying at opposite sides of a reentrant arc developed on a radius approximating that of the knuckle 15. These flats and the arcuate edge are each prolonged above and below the body proper of said member 21 by flange sections 24 and 25, respectively, so as to produce a mounting base. The overall length of this base, considered in a direction perpendicular to the body proper, approximates the length of the knuckle 15.

In adapting the mounting plate 20 to the mounting base, bars 27 are welded to the face of the former along opposite sides of the slots 19, and the flats 22 of the wing sections of the base seat against these adapter bars and are bolted or otherwise secured thereto, as at 28, in position such that the base substantially saddles the knuckle 15. When so mounted, the center of the ring member coincides or approximately coincides with the vertical center line of the perch leg 11. Considered along the major and minor axes of the elliptical figure, the internal diameters of the ring member are such (see Fig. 2) as to provide clearance with the leg 11 as the ring member moves in opposite directions from the normal centered position shown by full lines into either the fore or the aft extreme represented by broken lines.

Ball-headed bolts 29 and 30 are secured to the ring member, one located along the aft end somewhat to the outside of the ring member's major axis, and the other located along the inside somewhat aft of the minor axis. The head 31 of the former such bolt depends below the ring member and provides the connecting ball joint for a transverse tie-rod 32 running from the steering arm at one side to the steering arm at the other side of the vehicle. The head 33 of the other bolt 30 surmounts the ring member, and provides the connecting ball-joint for a drag-link 34 running rearwardly from the steering arm for operative interconnection, through the usual steering pitman, with the vehicle's steering wheel. The drag-link perforce connects with only one of the two steering arms, wherefor it will be understood that the bolt 30 is applied to a single said steering arm, determined by whether the concerned vehicle is a right or a left-hand drive.

It will be apparent that the described steering arm is unusually rugged and will safely withstand shock forces of a severity far beyond the capabilities of cantilever-type arms. The design is one which in no way interferes with normal suspension practice or with the turning movements of the wheel.

While the structure here illustrated and described is now considered to best exemplify the invention it will be understood that departure can be made within the scope of the invention, wherefor I intend that no limitations be implied and that the hereto annexed claims be given the broadest interpretation to which the employed language fairly admits.

What I claim is:

1. In a steering assembly, in combination with an axle beam provided at each end with an upwardly directed leg yoking the two arms of a terminal fork and having said fork-arms bored on a coinciding vertical axis, and a respective wheel hub for each end of said axle beam presenting a steering knuckle received between said fork-arms and pivoted thereto by a king pin: a respective steering arm for each wheel hub comprised of a ring member fixed to the hub and encompassing the related yoking leg of the axle beam with sufficient clearance provided to enable the hub to turn in relation to the beam between given limits of steering motion, and a transverse tie-rod extending between and connected to the two ring members, means being provided by one of said ring members for connecting a longitudinal drag-link thereto, said ring member being formed along one edge with co-planar flats disposed at opposite sides of a re-entrant opening which saddles the steering knuckle with the flats seating against and bolted to a mounting plate rigid with the wheel hub.

2. Structure according to claim 1 in which the connection from each ring member to the tie-rod and the means for connecting the concerned ring member to the drag-link comprises a respective ball-headed bolt secured to the ring member with the ball head being adapted in each instance to be received in a respective mating socket for producing a ball-joint coupling, said bolts being so applied that the ball head of the bolt which connects with the tie-rod lies below the ring member and the ball head of the bolt which connects with the drag-link lies above the ring member.

3. In a steering assembly for an automotive vehicle, in combination: an axle beam provided at each end with a vertical leg yoking the two arms of a terminal fork and having said fork-arms bored on a coinciding vertical axis, a respective wheel hub for each end of the axle beam presenting a mounting plate facing inwardly toward the longitudinal center line of the vehicle and having a steering knuckle received between and pivoted by a king-pin to said fork-arms in a centrally placed vertical slot provided by the mounting plate, the steering knuckle projecting inwardly toward said longitudinal center line beyond the face of the mounting plate, a respective steering arm for each wheel hub comprised of a ring member provided along one edge with co-planar flats disposed at opposite sides of a diameter of the member, the ring member having flanges extending as prolongations of said flats above and below the ring member proper, said flanges bearing against and being secured by mounting bolts to adapter bars welded to the mounting plate at opposite sides of said slot, said ring member encompassing the related yoking leg of the axle beam with sufficient clearance provided to enable the hub to turn in relation to the beam between given limits of steering motion, and a transverse tie-rod extending between and connected to the two ring members, means being provided by one of said ring members for connecting a longitudinal drag-link thereto.

References Cited in the file of this patent
UNITED STATES PATENTS

| | | |
|---|---|---|
| 1,030,793 | Schumacher | June 25, 1912 |
| 1,697,784 | Seaholm | Jan. 1, 1929 |
| 2,153,271 | Paton | Apr. 4, 1939 |
| 2,364,183 | Ash | Dec. 5, 1944 |